United States Patent
Leman et al.

(10) Patent No.: US 6,543,818 B2
(45) Date of Patent: Apr. 8, 2003

(54) DEVICE FOR ASSEMBLING AXISYMMETRIC COMPONENTS

(75) Inventors: Frédéric Leman, Evry (FR); Guy Vieillefond, Evry (FR); Mathieu Bos, Zonhoven (BE); Sébastien Ryhon, Sprimont (BE)

(73) Assignees: Techspace Aero S.A. (BE); Snecma Moteurs (BE)

( * ) Notice: Subject to any disclaimer, the term of this patent is extended or adjusted under 35 U.S.C. 154(b) by 0 days.

(21) Appl. No.: 09/871,414

(22) Filed: May 30, 2001

(65) Prior Publication Data

US 2001/0052703 A1 Dec. 20, 2001

(30) Foreign Application Priority Data

May 31, 2000 (EP) .............................. 00870119

(51) Int. Cl.$^7$ ................................ F16L 23/00
(52) U.S. Cl. ...................... 285/412; 285/330; 285/368; 403/337
(58) Field of Search ................. 285/363, 368, 285/412, 229, 330; 403/335, 337, 6, 7, 8, 292, 294

(56) References Cited

U.S. PATENT DOCUMENTS

| | | | |
|---|---|---|---|
| 1,965,357 A | | 7/1934 | Robinson |
| 2,436,070 A | * | 2/1948 | Lassa ........................... 285/412 |
| 3,415,547 A | * | 12/1968 | Yano ............................ 285/368 |
| 5,024,585 A | * | 6/1991 | Kralovec ...................... 285/368 |
| 5,052,891 A | * | 10/1991 | Burkholder .............. 416/198 A |
| 5,388,963 A | * | 2/1995 | Dimmick et al. ........ 416/198 A |
| 5,829,794 A | * | 11/1998 | Schulz-Hausmann et al. ... 285/368 |

FOREIGN PATENT DOCUMENTS

| | | | | |
|---|---|---|---|---|
| AU | 0005177 | * | 4/1927 | ................. 285/368 |
| DE | 0316831 | * | 12/1919 | ................. 285/368 |
| DE | 2527051 A | | 1/1977 | |
| EP | 0940179 A1 | | 9/1999 | |
| FR | 0584100 | * | 1/1925 | ................. 285/368 |
| FR | 0770143 | * | 9/1934 | ................. 285/368 |

OTHER PUBLICATIONS

European Search Report from Application EP 00 87 0119.
English Translation of European Search Report from Application EP 00 87 0119.
English Translation of Claims for EP 0 940 179 A1.
Delphion Printout Containing English Abstract for EP 0 940 179 A1.
English Translation of Claims for DE 2 527 051.

* cited by examiner

*Primary Examiner*—Lynne H. Browne
*Assistant Examiner*—Aaron Dunwoody
(74) *Attorney, Agent, or Firm*—Knobbe, Martens, Olson & Bear LLP

(57) ABSTRACT

The present invention relates to an axisymmetric structural component, one of the ends of which is fitted with an inner circular flange for assembling, by bolting. The axisymmetric structural component with a second axisymmetric structural component. The flange comprises housings for receiving fixing elements such as bolts, pins or threaded rods. The housings are arranged on the circumference of the said flange at regular intervals. Each housing is, in longitudinal section (A—A) along a plane passing through the rotational axis of the component, T-shaped and consists of a first essentially cylindrical portion which is longitudinally open on the inner face (x) of the axisymmetric structural component and transversely open on the contact face (y) of the flange in the assembly. A second essentially semi-cylindrical portion is mounted on the flange which is also longitudinally open on the inner face (x) of the said structural component having an essentially D-shaped transverse section. The diameter of the first cylindrical portion is less than the diameter of the semi-cylindrical portion.

7 Claims, 2 Drawing Sheets

DEVICE FOR ASSEMBLING AXISYMMETRIC COMPONENTS

CROSS-REFERENCE TO RELATED APPLICATIONS

This application claims priority to European Application Serial Number 000870119.5 filed on May 31, 2000.

FIELD OF THE INVENTION

Description of the Related Art

Flanges which are produced directly by turning in the thickness inside or outside at least one of the components are usually used for assembling axisymmetric components by bolting.

The term "bolting" means firmly securing by screwing tight using bolts or screws, pins or threaded rods which may be combined with nuts.

The type of flange most commonly used for assembling axisymmetric components, for example the bolted cones used as bearing pedestals, is an outer flange with or without reinforcements.

The flange factor is defined as a factor which takes into account the fact that the axis of the force passing through the body of the support and the axis of the screw are misaligned, which results in the creation of a bending moment. The value of the flange factor theoretically ranges between 1 (alignment of the forces) and infinity (complete misalignment).

The flange factor is proportionately larger the greater the misalignment. The reason for this is that this misalignment generates a lever arm (bending moment) which introduces an increase in the force passing through the screws during a detachment of the flanges. A large flange factor (>>1) is thus harmful to the mechanical behavior of a bolted assembly.

The aim of the presence of reinforcements on the flange is to reduce the flange factor. The reason for this is that these reinforcements make it possible to reduce the above-mentioned lever arm.

Inner flanges are also known as making it possible to reduce the flange factor, but generally they nevertheless do not have any reinforcements since they are very problematic to produce.

SUMMARY OF THE INVENTION

The present invention aims to propose a device for assembling two axisymmetric components by bolting, which does not have the drawbacks of the prior art.

In particular, the present invention aims to propose a solution which has a flange factor of close to 1.

The present invention is also directed towards proposing a process for producing an inner flange arranged on an axisymmetric structural component, this process being easy to carry out.

The present invention relates to an axisymmetric structural component, one of the ends of which is fitted with an inner circular flange for assembling, by bolting, the said axisymmetric structural component with a second axisymmetric structural component. The flange comprises housings for receiving fixing elements such as bolts, pins or threaded rods. The housings are arranged on the circumference of the flange at regular intervals. The housings are T-shaped in a longitudinal section and consist of a first essentially cylindrical portion which is longitudinally open on the inner face of the axisymmetric structural component and transversely open on the contact face of the flange in the assembly. A second essentially semi-cylindrical portion is mounted on the flange, which is also longitudinally open on the inner face of the said structural component, having an essentially D-shaped transverse section. The diameter of the first cylindrical portion is less than the diameter of the semi-cylindrical portion for each of the housings.

Advantageously, the axisymmetric structural component is made of aluminum.

The invention also relates to a process for manufacturing an inner circular flange arranged on an axisymmetric structural component, which is preferably conical or cylindrical, and which has housings for receiving fixing elements such as bolts, pins or threaded rods. The housings are machined at regular intervals on the circumference of the flange preferably using a milling cutter which is essentially T-shaped and such that the axis of the said milling cutter moves, during machining, in a direction which is essentially perpendicular to the rotational axis of the component, preferably radially, while at the same time remaining parallel to this rotational axis.

DETAILED DESCRIPTION OF THE PREFERRED EMBODIMENT

Figure 1A:
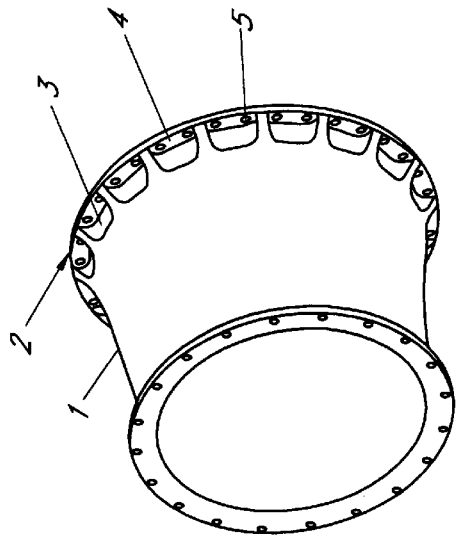
FIGS. 1a and 1b each represent a perspective view of an axisymmetric component fitted with an outer flange with reinforcements, according to the prior art.
Figure 1B:
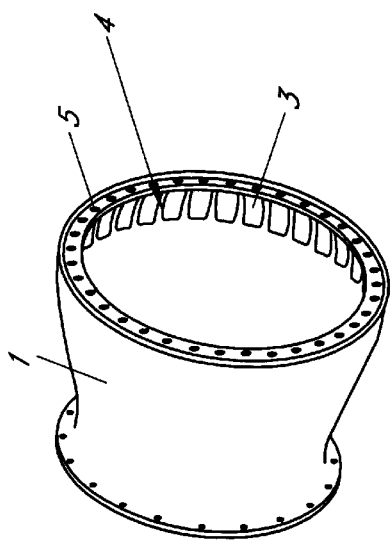

FIGS. 1a and 1b represent one particular embodiment of an axisymmetric structural component according to the prior art (for example a cone) to be assembled.

Figure 2:
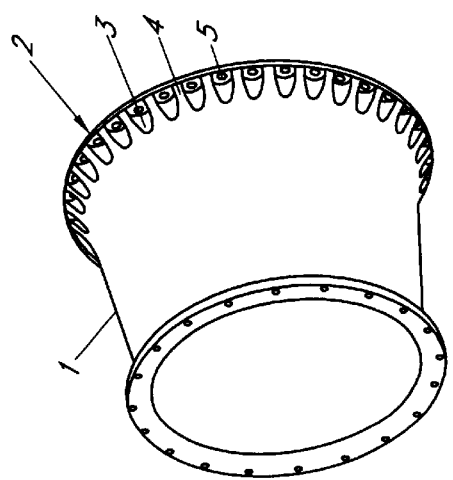
FIG. 2 represents a perspective view of an axisymmetric component fitted with an inner flange with reinforcements, according to the prior art.

In order to reduce the flange factor, it is also possible to machine an inner flange, as represented in FIG. 2. In this case, it is theoretically possible to have reinforcements 4 between the recesses 3; however, in practice, this operation is difficult to perform.

DESCRIPTION OF ONE PREFERRED EMBODIMENT OF THE INVENTION

Figure 4:
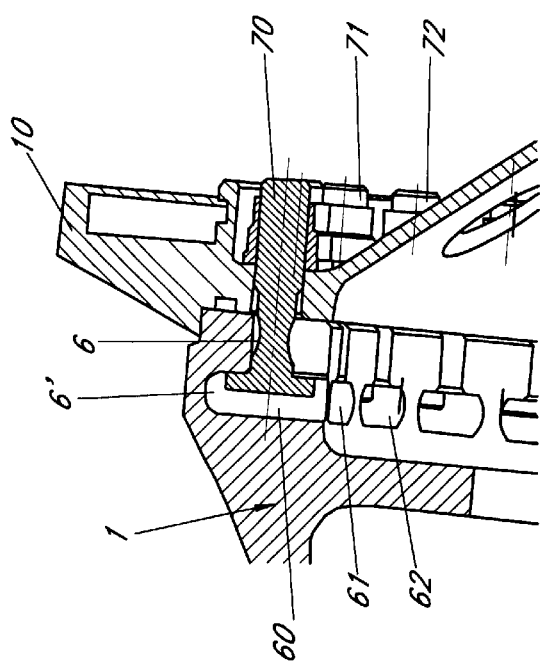
FIG. 4 represents a view in section along AA of an assembly of two axisymmetric components, one of which is fitted with a flange according to the invention, as represented in FIG. 3.
Figure 3:
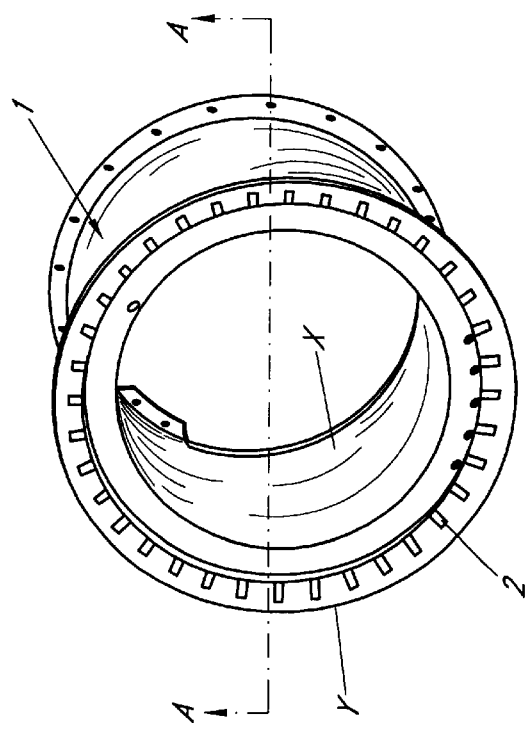
FIG. 3 represents a perspective view of an axisymmetric component fitted with an inner flange with reinforcements, according to the invention.

The present invention solves this problem by producing a flange inside the first axisymmetric structural component to be assembled as represented in FIGS. 3 and 4.

In a first stage, a solid flange 2 is produced by turning inside the first axisymmetric structural component 1 to be assembled, which corresponds in this case to a conical component. This flange is then machined in particular using a T-shaped milling cutter in order to make the orifices corresponding to the housings 60, 61, 62 into which may be introduced the head of a bolt 70, 71, 72 to assemble the conical component 1 with the second axisymmetric structural component 10 as shown more particularly in FIG. 4.

FIG. 4 represents a view in section A—A along a plane passing through the rotational axis of the component 1, represented in FIG. 3. Such a section will be referred to herein as a "longitudinal section". Similarly, the term "cross section" will be denoted herein as being the intersection of the component 1 with a plane which is perpendicular to its rotational axis.

Each of the housings 60, 61, 62 will thus be T-shaped in longitudinal section. Each housing will consist of a first essentially cylindrical portion 6 which is longitudinally open on the inner face (x) of the axisymmetric structural component 1 and transversely open on the contact face (y) of the flange 2 in the assembly, on which is mounted an essentially semi-cylindrical second portion 6' which is also longitudinally open on the inner face (x) of the said structural component 1.

This technique for producing an inner flange has several advantages. The fastening structure is such that the flange factor is very close to 1. The technique is industrially viable, in particular for small tapering of the components to be assembled; the use of material is optimized, which may be preferred with the use of aluminum, which has a low specific strength. For a given overall size, the amount of material available is limited.

What is claimed is:

1. An axisymmetrical structural component, comprising:
   an inner circular flange,
   a plurality of housings for receiving fixing elements,
   wherein said housings are T-shaped in a longitudinal section along a plane passing through the rotational axis of said component and comprise a cylindrical portion, wherein said cylindrical portion is longitudinally open on the inner face of said component and transversely open on the contact face of said flange, on which a semi-cylindrical portion is mounted, said semi-cylindrical portion being longitudinally open on the inner face of said component and having a D-shaped transverse section, the diameter of said cylindrical portion being less than the diameter of said semi-cylindrical portion.

2. The axisymmetrical structural component of claim 1, wherein said component comprises aluminum.

3. The axisymmetrical structural component of claim 1, wherein said housings are arranged on the circumference of said flange at regular intervals.

4. The axisymmetrical structural component of claim 1, wherein said receiving fixing elements are selected from the group consisting of bolts, pins and threaded rods.

5. A process for manufacturing an inner circular flange on an axisymmetrical structural component comprising housings for receiving fixing elements, said process comprising:
   machining said housings on the circumference of said flange at regular intervals using a milling cutter, wherein said cutter is essentially T-shaped and during milling the axis of said milling cutter moves in a direction which is perpendicular to the rotational axis of said component while at the same time remaining parallel to said rotational axis.

6. The process of claim 5, wherein said axisymmetrical component is conical or cylindrical.

7. The process of claim 5, wherein said housings are adapted for receiving fixing elements selected from the group consisting of bolts, pins and threaded rods.

* * * * *

UNITED STATES PATENT AND TRADEMARK OFFICE
CERTIFICATE OF CORRECTION

PATENT NO. : 6,543,818 B2
DATED : April 8, 2003
INVENTOR(S) : Leman et al.

It is certified that error appears in the above-identified patent and that said Letters Patent is hereby corrected as shown below:

Title page,
Item [73], Assignee, the residence "Snecma Moteurs (BE)" should read
-- Snecma Moteurs (FR) --.

Signed and Sealed this

Second Day of September, 2003

JAMES E. ROGAN
*Director of the United States Patent and Trademark Office*